United States Patent [19]

Reisch et al.

[11] 4,027,098

[45] May 31, 1977

[54] METHOD FOR ESTABLISHING CONFERENCE CONNECTIONS IN DIAL-OPERATED TELECOMMUNICATION EXCHANGES

[75] Inventors: Hans Reisch, Munich; Dieter Giersberg, Westerham, both of Germany

[73] Assignee: Siemens Aktiengesellschaft, Munich, Germany

[22] Filed: Dec. 22, 1975

[21] Appl. No.: 642,698

[30] Foreign Application Priority Data

Dec. 20, 1974 Germany .................. 2460603

[52] U.S. Cl. .............................. 178/3; 179/18 BC
[51] Int. Cl.² ........................................ H04L 11/00
[58] Field of Search ............... 178/2, 3; 179/18 BC

[56] References Cited

UNITED STATES PATENTS

| | | | |
|---|---|---|---|
| 3,504,130 | 3/1970 | Gorgas et al. | 179/18 BC |
| 3,515,807 | 6/1970 | Clark | 179/18 BC |
| 3,697,672 | 10/1972 | Reisch | 178/3 |
| 3,912,874 | 10/1975 | Botterell et al. | 179/18 BC |

Primary Examiner—Thomas A. Robinson
Attorney, Agent, or Firm—Gerald L. Lett

[57] ABSTRACT

A method for operating dial-operated telecommunication exchanges equipped with broadcast devices to make conference connections is described. Responsive to signals emitted from a calling subscriber, a conference switching device assigned to the broadcast device is activated; the conference switching device completes the connection in accordance with the switching information contained in the aforementioned signals. The connection is completed as a conventional conference connection in which all participating called subscribers receive all transmitted messages, as a semi-conference connection wherein messages transmitted by each called subscriber are received only by the calling subscriber or as a sub-conference connection wherein messages transmitted by the calling subscriber are received only by a specific called subscriber and messages transmitted by the latter are received only by the calling subscriber.

5 Claims, 4 Drawing Figures

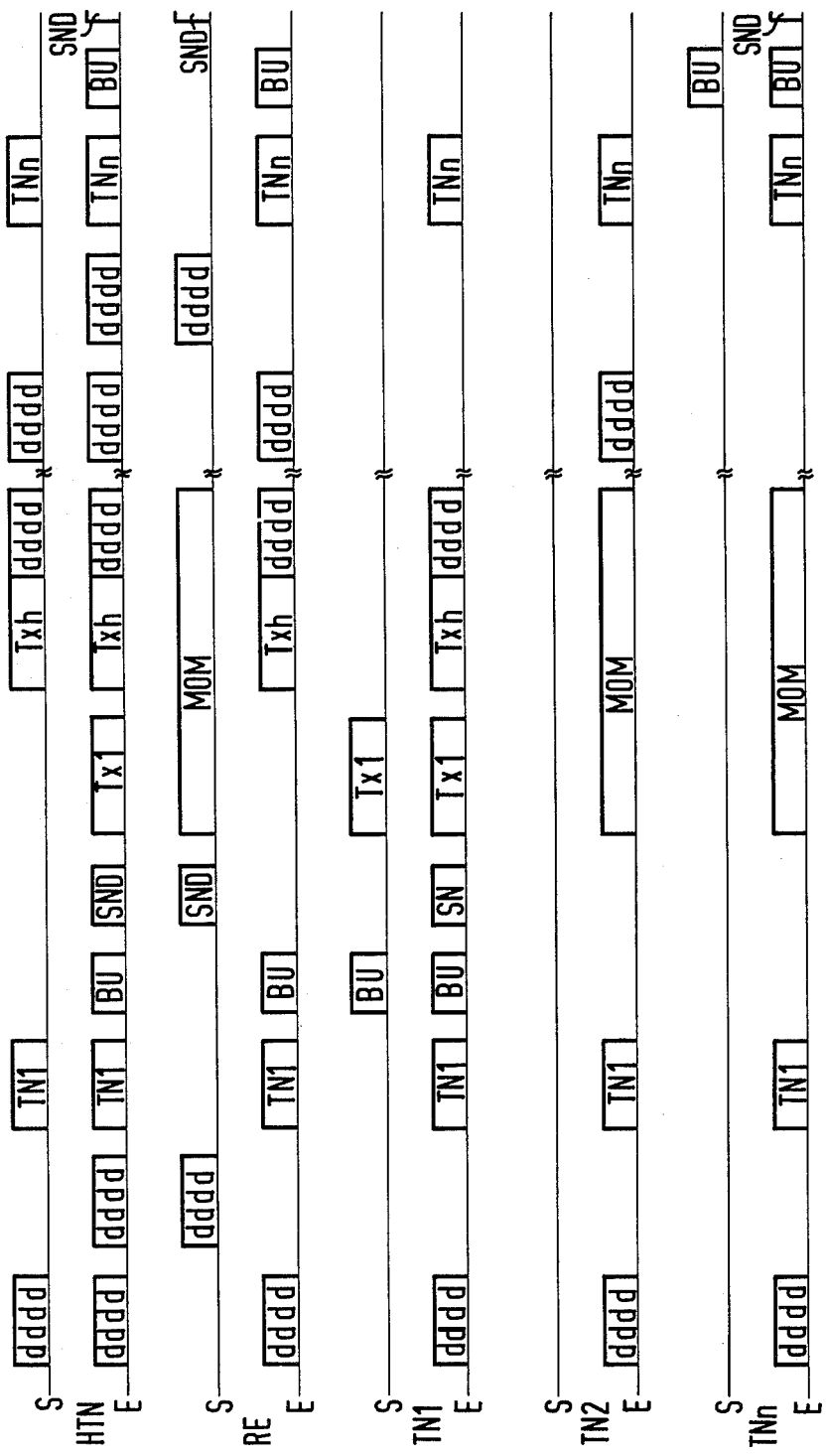

METHOD FOR ESTABLISHING CONFERENCE CONNECTIONS IN DIAL-OPERATED TELECOMMUNICATION EXCHANGES

BACKGROUND OF THE INVENTION

The invention relates to a method for establishing conference connections in dial-operated telecommunication exchanges employing broadcast devices already provided in the exchange.

It has been known to offer, for example, to subscribers connected to a dial-operated teleprinter exchange the possibility of establishing broadcast and conference connections. During a broadcast connection the calling subscriber who is establishing the connection is able to send his information to a plurality of called subscribers, although the called subscribers participating in the broadcast are not able to transmit information back to the calling subscriber. During a conference connection, however, the participating called subscribers do not only receive the information transmitted from the calling subscriber, but can also themselves transmit information which is received both by the calling subscriber and by all the other called subscribers participating in the conference connection. Broadcast connections are established via a broadcast device provided in the exchange. In the event that conference connections are also to be possible, this device can be supplemented by an assigned conference switching device.

However, a few problems arise in connection with the establishment of broadcast and conference connections. Since in known exchanges the conference switching devices are either separate from the broadcast devices, and thus can be reached by different subscriber numbers, or are connected to the broadcast device by means of switching bridges, the calling subscriber can only establish either a broadcast connection or a conference connection.

Another problem consists in the fact that in a conference connection, the items of information transmitted from the called subscribers to the calling subscriber, who is establishing the conference connection, are received by all the subscribers participating in the conference connection. It is not possible for an item of information emanating from the calling subscriber to be transmitted just to one single member of the called subscribers participating in the conference connection, and neither is it possible to transmit an item of information emitted from one single member of the called subscribers participating in the conference connection merely to the calling subscriber.

An object of the invention is to provide a method for operating telecommunication exchanges which serves to avoid these disadvantages.

More particularly, another object of the invention is to provide the subscribers with the possibility that, although a broadcast connection has been established, they can make a change to conference connections, and within a conference connection can also change to different types of conference connections.

SUMMARY OF THE INVENTION

In accordance with the invention, the foregoing and other objects are achieved in that, as a result of a central analysis of the information transmitted from a calling subscriber entitled to participate in a broadcast connection, a conference switching device assigned to the broadcast device is actuated. In the conference switching device, in dependence upon this information, a connection is established either as a normal conference connection, in the course of which all the participating subscribers receive all the items of information, or as a semi-conference connection in the course of which the items of information emitted from the participating subscribers each are received only by the calling subscriber, or as a sub-conference connection, in the course of which items of information emitted from the calling subscriber are received only by one specific called subscriber, and the items of information emitted by said called subscriber are received only by the calling subscriber.

It is advantageous to transmit a specific combination of symbols to the central broadcast device to constitute the foregoing information for in each case a broadcast connection, a full conference connection, a semi-conference connection and a sub-conference connection, and as a confirmation of the analysis effected in the central broadcast device, and of a corresponding switch-over to the stipulated type of connection, to retransmit the same combination of symbols back to the calling subscriber. This involves the advantages that no additional operating equipment is needed in the subscriber stations themselves, and the text analysers and text transmitters already provided in broadcast devices can be additionally employed.

The transmission of the criteria which bring about the switch-over in the central device can be effected immediately following the transmission of the dial signals which serve to characterize the subscribers participating in the connection, or can also be effected at an arbitrary time during the existence of a connection. This involves the advantages that the calling subscriber can change the particular type of connection at any time during a conference connection, thus, for example, can at any time change from a full-conference connection to a semi-conference connection or sub-conference connection.

BRIEF DESCRIPTION OF THE DRAWINGS

The principles of the invention will be more readily understood by reference to a description of a preferred embodiment for carrying out the method of the invention given hereinbelow in conjunction with the drawings which are briefly described as follows.

FIG. 4 is a timing diagram for the FIG. 1 embodiment illustrating the time flow in the case of a sub-conference connection.

DETAILED DESCRIPTION OF THE DRAWINGS

Figure 1:
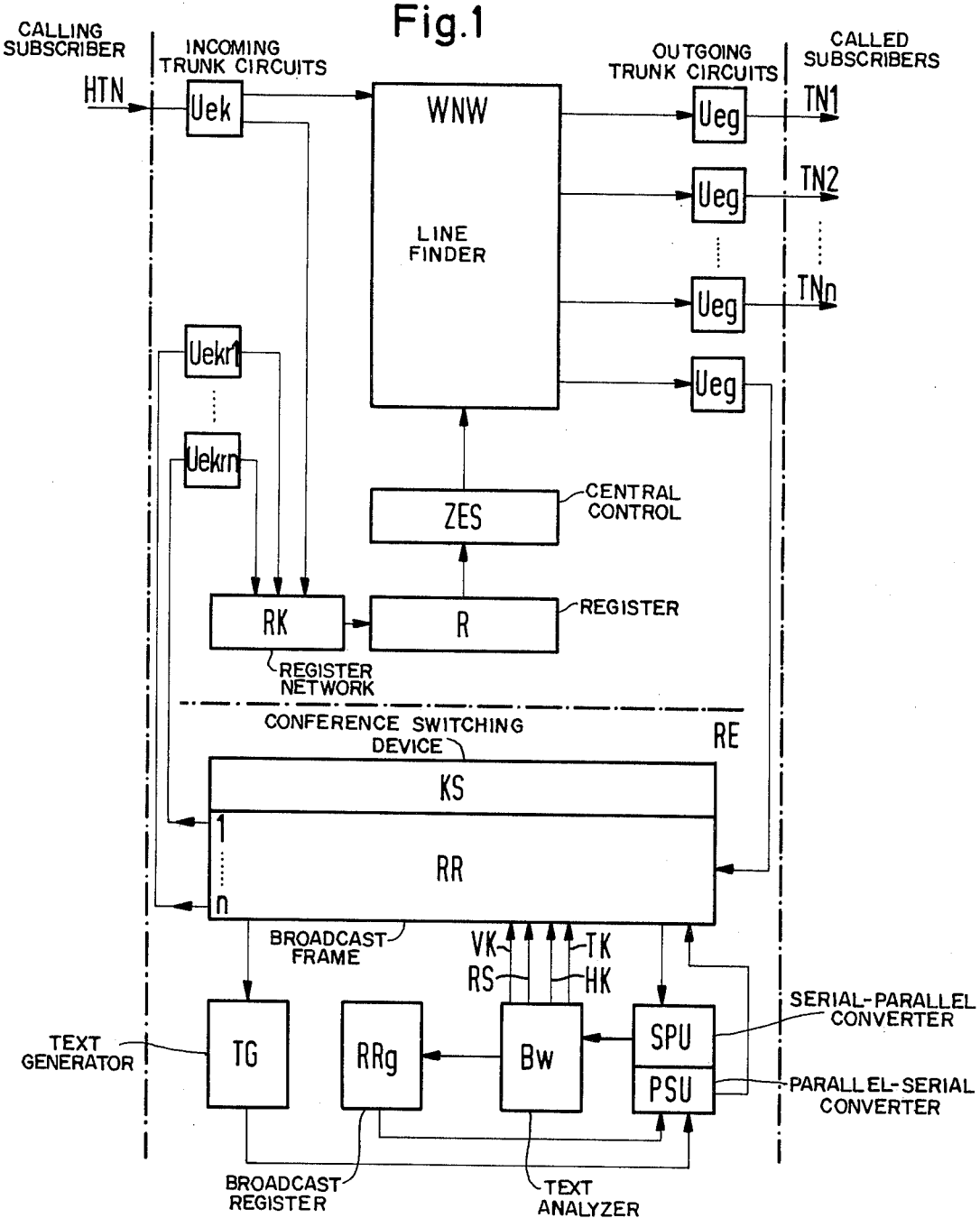
FIG. 1 is a block-schematic diagram of exemplary apparatus for carrying out the method of the invention.

FIG. 1 illustrates those parts of a centrally controlled telecommunication exchange which are essential for the understanding of the invention. A teleprinter exchange is illustrated, and it has been assumed that a calling subscriber, which in the following will be referred to as main subscriber HTN, desires to establish a connection to a plurality of subscribers TN1 to TNn. For this purpose, the main subscriber HTN emits a signal containing the switching information needed for the establishment of a broadcast connection which signal, in the exchange, passes via an incoming trunk circuit Uek seized in the incoming direction and via a register coupler RK into a central register R. By means of a central control unit ZES, a line finder WNW is operated in such manner that the main subscriber HTN is connected by an outgoing trunk circuit Ueg in the outgoing direction to a broadcast device RE. The dialed information emitted from the main subscriber HTN for subscribers TN1 to IN participating in the connection are transferred by a serial-parallel converter SPU and by a text analyzer BW into a broadcast register RRg. The analyzer BW basically undertakes checking functions which, for example, makes it possible to check on the entitlement of the subscribers to participate in the broadcast connection, and also of every incoming dialed signal.

By means of outputs 1 to n of a broadcast frame RR, the incoming trunk circuits Uekr1 to Uekrn are seized in the incoming direction, and register R is in each case switched on by register coupler RK. Using a parallel-serial converter PSU and the broadcast frame RR, the content of broadcast register RRg is transferred into the registers R. The central control unit ZES in the exchange controls the establishment of the connections between the main subscriber HTN and the subscribers TN1 to TNn participating in the broadcast connection.

A detailed description of the construction of the mode of operation of the above described prior art apparatus for establishing a broadcast connection is described, for example, in U.S. Pat. No. 3,697,672, issued Oct. 10, 1972, corresponding to the German Pat. No. 1,762,761.

The main subscriber HTN can, in known manner, emit its information in the form of a demand for a broadcast. However, it can also, in accordance with the invention, select a full conference connection, a semiconference connection and a sub-conference connection by emitting further signal information. If, as provided within the scope of the invention, letter combinations which do not occur in the transmitted text are used as data for establishing the individual types of connection, then this data can be evaluated in the analyzer BW of the broadcast device RE. In dependence upon the arrival and recognition of these data, control signals RS, VK, HK, and TK are emitted to the broadcast frame RR, where the conference switching device KS in which the corresponding control processes are then carried out in known manner is connected.

The timing of a full-conference connection and a subsequent switch-over to normal broadcast operation will be described in detail with reference to FIG. 2.

It will be assumed that the main subscriber HTN has established a connection to the subscribers TN1 and TNn in the known manner as a broadcast connection. As a signal for the switch-over to a full-conference connection, the main subscriber HTN emits a closed group of letters, in the example the group of letters *bbbb*. These are received in the broadcast device RE where they lead to the emission of control signal VK to the broadcast frame. This causes the conference switching device to switch on, where, simultaneously, the corresponding switching measures for a full conference connection are carried out. Following the switch-over in the broadcast device, the main subscriber HTN receives confirmation of switch-over in the form of the group of letters *bbbb*. The group of letters emitted from the main subscriber HTN is also received by all the other subscribers IN1 to TNn so that these too receive information concerning the following type of connection.

The main subscriber HTN now sends a message request for the first of the subscribers participating in the conference connection, for example for the subscriber TN1. This message request is also received by all the participating subscribers TN2 to TNn. After a determinate transmission pause P, which can amount to 1 to 3 seconds, for example, the first subscriber TN1 emits his text Tx1 which is received by the main subscriber HTN and by all the participating subscribers TN1 to TNn. After the expiration of a determinate transmission pause P, the main subscriber HTN emits the message request for the next subscriber, for example, for the subscriber TN2. These processes are repeated until finally the last subscriber TNn has also transmitted his text Txn. The main subscriber HTN can now terminate the transmission by emitting the clearing signal.

Figure 2:
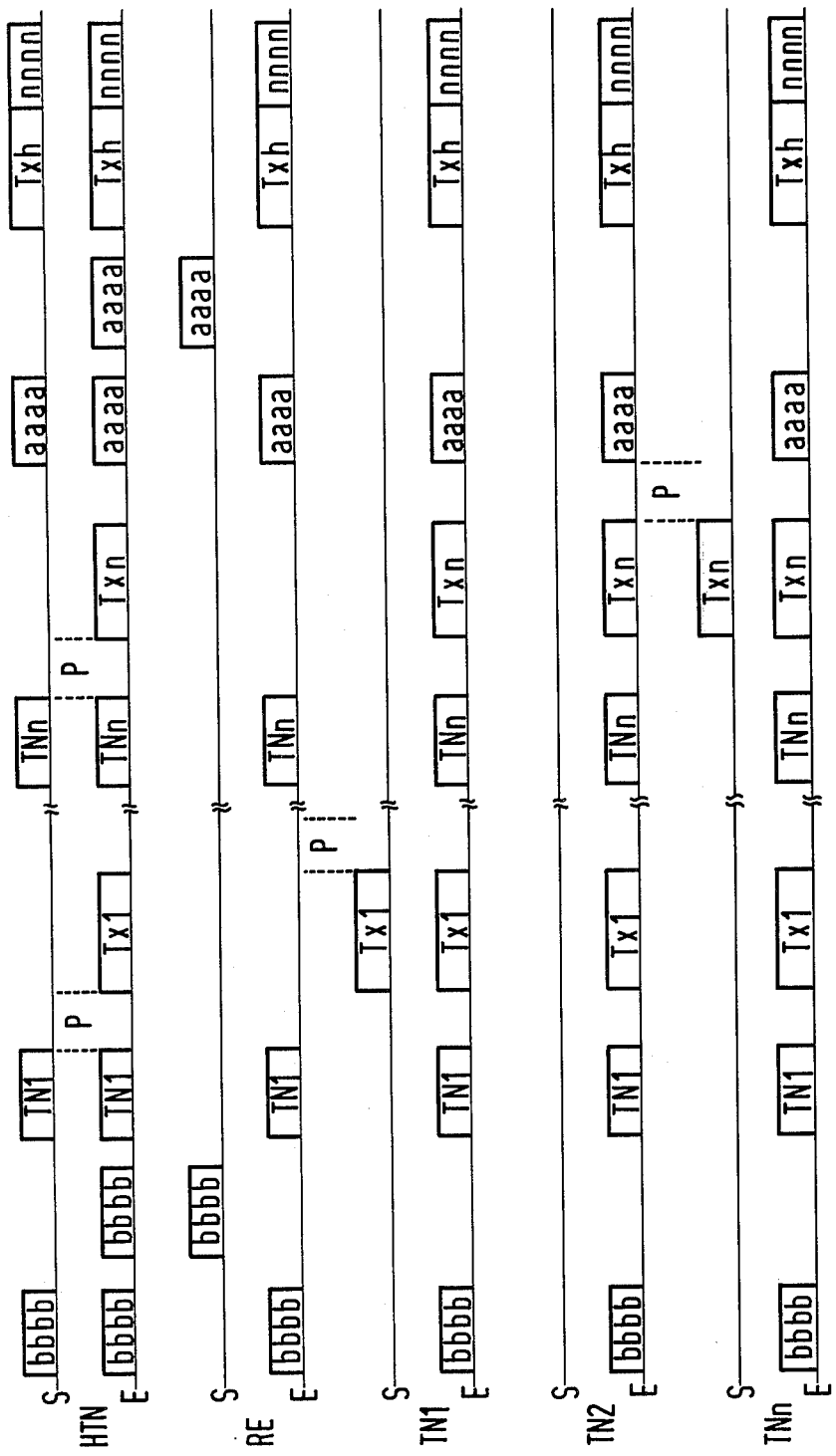
FIG. 2 is a timing diagram illustrating the operation of the FIG. 1 embodiment, particularly the time flow of a full-conference connection with switch-over to a normal broadcast connection.

However, the main subscriber can also, as illustrated in FIG. 2, switch over to normal broadcast operation in order, for example, to send all the subscribers participating in the connection a corresponding response to the texts he has received from the individual subscribers. To this end, the main subscriber HTN emits a broadcast signal which is again a closed group of letters, and in the example the group of letters *aaaa*. These are received both in the broadcast device RE and also in all the participating subscriber stations Tn1 to TNn. Upon the recognition of this group of letters in the broadcast device RE, a switch-over is made therein to broadcast operation, and this switch-over is confirmed by the retransmission of the group of letters *aaaa* to the main subscriber HTN. The main subscriber HTN now emits a final text Txh which is received by all the participating subscribers Tn1 to TNn. Immediately thereafter, the clearing signal, which is formed in known manner by the group of letters *nnnn*, can be emitted. In the exchange this leads, in known manner, to the termination of the broadcast.

Figure 3:
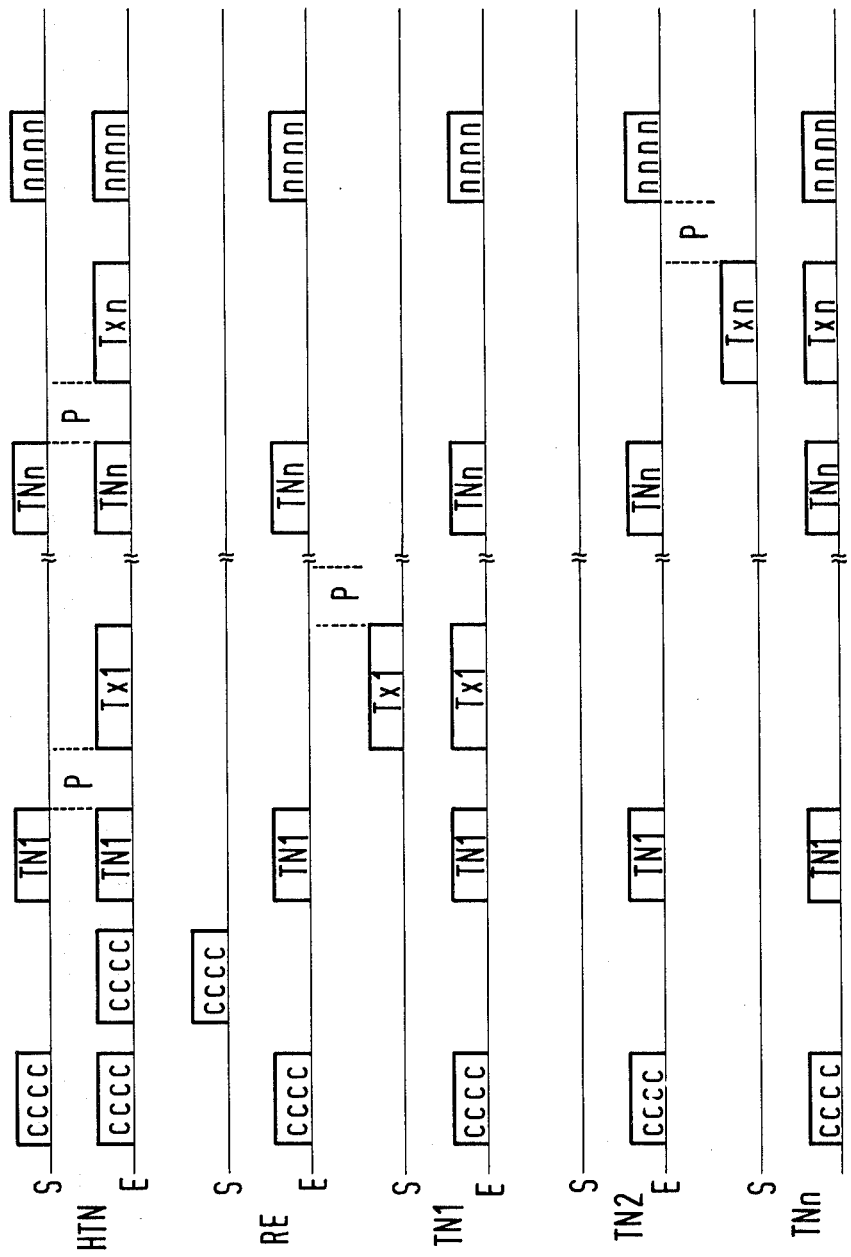
FIG. 3 is a timing diagram, also for the FIG. 1 embodiment, illustrating the time flow in the case of a semi-conference connection.

The switch-over to semi-conference operation is effected in a similar fashion. It will be seen from FIG. 3 that the group of letters *cccc* emitted from the main subscriber HTN, as the signal for switch-over to semi-conference operation, is again received by all the participating subscribers TN1 to TNn and in the broadcast device RE. The analysis and switch-over to the desired type of operation are effected in the broadcast device RE, whereupon the main subscriber receives confirmation of the switch-over by the retransmission of the group of letters *cccc*. The main subscriber then emits the message request to a participating subscriber, e.g., to the subscriber TN1. After the expiration of a determinate transmission pause P, the aforementioned subscriber commences to transmit his text Tx1 which however, as this is a semi-conference connection, is received only by the main subscriber HTN. In each case after the expiration of the determinate transmission pause, which commences at the end of a text transmission, the main subscriber HTN can request another of the subscribers participating in the connection to transmit his text. When, finally, the last subscriber TNn has been requested to transmit his text, and when this text Txn has been received by the main subscriber, the latter can transmit a final item of information to all the participating subscribers TN1 to TNn. However, as shown in FIG. 3, the main subscriber can also immediately emit the clearing signal *nnnn* and terminate the broadcast connection in known manner.

Another important mode of operation is that of the sub-conference connection. The processes which take place in this type of connection will be explained with reference to FIG. 4. The main subscriber HTN again emits a given group of letters, in the example the group of letters *dddd*, which serves as the sub-conference connection indicating signal and is received by all the participating subscribers TN1 to TNn and in the broadcast device RE. Following the analysis of this signal in the broadcast device, and an initial switch-over to semi-conference operation, the main subscriber receives confirmation that the switch-over has taken place by the return of the signal *dddd*. The message request subsequently transmitted from the main subscriber HTN for a specific subscriber, e.g., TN1 is received by the latter and by all the other subscribers. The subscriber TN1 answers by returning a signal, e.g., BU (letter switch-over). This signal finally passes to the broadcast device RE, and to the main subscriber HTN. The analysis of this signal in the broadcast device RE causes the latter to switch-over to sub-conference operation.

The fact that the switch-over to sub-conference operation has taken place is communicated to the main subscriber HTN and to the subscriber TN1 by the transmission of the proceed-to-transmit request SND. The subscriber TN1 then commences to transmit his text Tx1 which is received only by the main subscriber HTN. At the end of the text, the main subscriber HTN can itself directly emit an item of information which is received only by the subscriber TN1.

It is also possible that the main subscriber HTN will firstly transmit a text which is then received only by the subscriber TN1 and that the subscriber TN1 then commences to transmit its information. The individual connection between the main subscriber HTN and the subscriber TN1 is terminated by the renewed transmission of the group of letters *dddd* on the part of the main subscriber HTN. For each individual connection, all the other subscribers, in the example the subscribers TN2 to TNn, receive a wait text MOM from the broadcast device RE.

The described processes can be repeated in an arbitrary sequence and with arbitrary frequency for all the subscribers TN1 to TNn.

Having exchanged the items of information between itself and each of the subscribers TN1 to TNn, the main subscriber HTN can always switch over to a different type of connection, e.g., to broadcast operation in order, for example, to transmit an item of information to all the subscribers. Here, as in the case of the sequences described with reference to FIGS. 2 and 3, the broadcast is always terminated by the main subscriber HTN which to this end transmits the group of letters *nnnn* in known manner.

Just as the analyzer provided in the broadcast device serves to analyze the groups of letters which have been agreed upon as switch-over criteria, the test generator TG provided in the broadcast device can also be used for the transmission of confirmation signals, transmitting requests and wait texts. For example, following transmission of a switch-over code causing a change from a broadcast to a conference connection, text generator TG is activated to reproduce the switch-over code then to retransmit it from the broadcast frame to the calling subscriber. This occurs over the connection already established between these two components, for example, from text generator TG to broadcast frame RR to the connected outgoing trunk circuit Ueg, through line finder WNW and via incoming trunk circuit Uek to the calling subscriber HTN. This use of the existing connection for the transmission of information regarding confirmation of switching and the manner in which it is derived is precisely like the arrangement described in U.S. Pat. No.3,697,672.

In addition, all the time monitoring processes to be conducted during a connection, for example the monitoring of the transmission pauses, can be carried out in the broadcast device, with the circuits already provided therein. The additional relays or switching devices required for this purpose do not represent a large extra outlay.

The invention has been explained merely in the form of a few selected examples. Naturally it lies within the scope of the invention to change the mode of operation several times during a connection, thus for example from a full-conference connection to a semi-conference connection, and subsequently to a sub-conference connection. Further, the method of the invention applies to all forms of apparatus capable of performing the steps defined in the appended claims.

We claim:

1. A method for selectively establishing variably restrictive forms of multiaddress connections in dial-operated teleprinter exchanges, comprising:

emission of a first signal from a calling subscriber station including a specific symbol combination in accordance with a desired form of multiaddress connection and containing switching information corresponding to the form of multiaddress connection to be completed, establishing, in accordance with the switching information contained in said first signal, a broadcast connection, a conference connection wherein all called subscribers receive all message signals, a semi-conference connection wherein message signals transmitted by the called subscribers are each received only by said calling subscriber, or a sub-conference connection wherein message signals transmitted by said calling subscriber are received only by a specific called subscriber and message signals transmitted by the specific called subscriber are received only by said calling subscriber.

2. The method defined in claim 1 comprising the additional step of:

sending to said calling subscriber station a second signal, upon completion of the selected connection indicated by said first signal, having a symbol combination like that of said first signal.

3. The method defined in claim 1 comprising the additional step of:

transmitting a third signal from said calling subscriber station indicating which of the called subscriber stations are to participate in the connection, said third signal being transmitted following said first signal.

4. The method defined in claim 1 wherein said first signal is emitted at an arbitrary time during an existing connection.

5. The method defined in claim 1 comprising the additional steps of:

sending, in the case of a said sub-conference connection, a wait signal to those of the called subscriber stations not participating in the sub-conference connection and resending from the calling subscriber station the said first signal initiating the sub-conference connection to terminate the sub-conference connection.

* * * * *